Jan. 11, 1966  RENÉ-PHILLIPE JACCARD  3,228,569
DISPENSING SYSTEM FOR SALT CELLARS, POTS AND SIMILAR CONTAINERS
Filed Sept. 15 1964  2 Sheets-Sheet 1

United States Patent Office 3,228,569
Patented Jan. 11, 1966

3,228,569
DISPENSING SYSTEM FOR SALT CELLARS, POTS AND SIMILAR CONTAINERS
René-Phillipe Jaccard, Petit-Lancy, Switzerland, assignor to Samuel Jack Kaufman, New York, N.Y.
Filed Sept. 15, 1964, Ser. No. 396,572
Claims priority, application Switzerland, Sept. 16, 1963, 11,384/63
3 Claims. (Cl. 222—196.3)

My invention has for its object an arrangement adapted to be used with dispensing containers provided with openings through which the contents of the containers such as salt or spices may be sprinkled.

According to my invention, a number of small movable rods are held inside at least a number of said openings in a manner such that when using the salt cellar, pepper box or the like small containers, these rods sweep along the periphery of the openings and prevent the material which is being spread from being deposited along the edges of the openings and damaging same.

Figure 1:
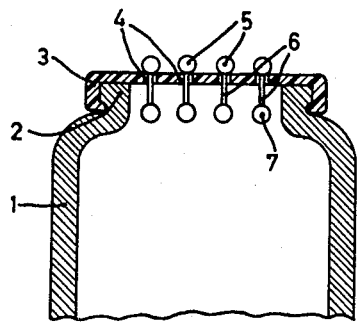
Figure 2:
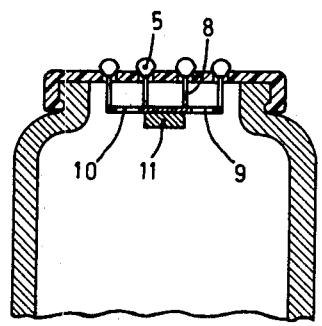
Figure 3:
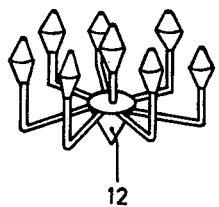
Figure 4:
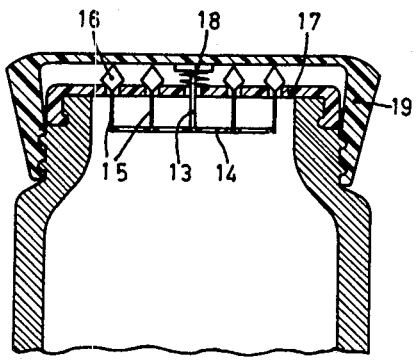
Figure 5:
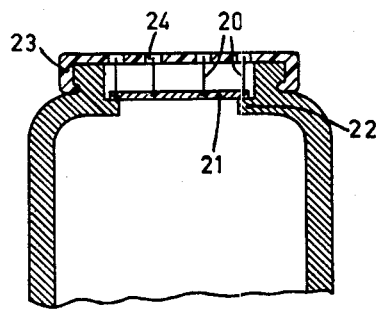
Figure 6:
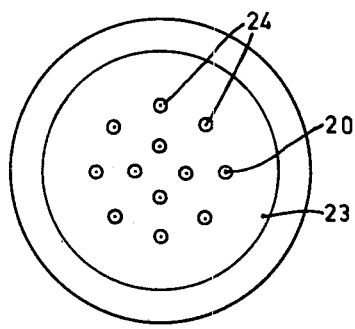

I have illustrated, by way of example, in the accompanying drawings four preferred embodiments of my invention, together with a modification thereof; in said drawings:

FIG. 1 is a vertical sectional view of a first embodiment.
FIG. 2 is a similar view of a second embodiment.
FIG. 3 is a perspective view of a detail modification of FIG. 2.
FIG. 4 is a vertical sectional view of a third embodiment.
FIG. 5 is a vertical sectional view of a fourth embodiment.
FIG. 6 is a plan view of the embodiment illustrated in FIG. 5.

Turning to FIG. 1, a small container 1 for salt or spices is provided with a neck 2 closed by a cover 3 of yielding plastic material. A number of circular openings 4 are formed in said cover so as to provide a communication with the inside of the container.

In each of said openings is fitted a head 5 formed by a solid ball rigid with a small rod 6 extending through the opening considered into the inside of the container. Said rod terminates inwardly of the container with a counterhead 7. The system including the head, rod and counterhead is advantageously made as a single part of plastic material which may be colored for instance.

Each of said systems is introduced under pressure into the corresponding opening of the cover and remains permanently attached thereto.

When the container is inoperative and stands upright, the heads closing the corresponding openings of the cover and the weight of the system including said heads cooperate in the fluidtightness of the arrangement. When the container is being used, it is turned upside down and shaken, which has for its result a controlled dropping out of its contents through the openings.

The counterheads associated with the rods and heads prevent any permanent outflow of the material to be sprinkled out of the container.

The movements of the container shift the rods inside the corresponding openings, so that each rod sweeps along the periphery of the cooperating opening and prevents the formation of deposits of salt or the like material, which would clog the opening and prevent normal operation of the container.

FIG. 2 shows a similar arrangement wherein the rods 8 carrying the heads 5 are interconnected inside the container. To this end, the inner ends of the rods are secured to a disc 9 provided with perforations 10 so that the system constituted by the heads, the rods and the disc forms a substantially rigid unit. Said embodiment is advantageous inasmuch as its assembly is easier, since all the rods may be urged simultaneously into the corresponding openings.

A small weight 11 is secured to the disc 9 or embedded in the latter and increases the inertia of the whole arrangement when the container is being moved, so that the rods sweep with a greater efficiency along the periphery of the corresponding openings. Said weight also improves the contacting between the heads and openings when the containers are in their inoperative position.

In the modification according to FIG. 3, the rods rigid with the heads are no longer secured to a disc, but are each provided with a radially inwardly directed extension forming a right angle with the remainder of the rod, so that said rods are interconnected at the center of the arrangement through said extensions; a connecting member rigidly secures the rod extensions together and may act also in a manner similar to the weight which has just been referred to.

FIG. 4 illustrates an arrangement similar to that illustrated in FIG. 2 with the difference however that the fluidtightness is obtained in a different manner. A rod 13 is secured to the center of the disc 14 carrying the rods 15 provided with the heads 16 extends through a central opening formed in the cover 17 and terminates with a head 18. A spring of non-oxidizable material is fitted between said head and said cover. When a cap 19 fitted over the container in its inoperative condition is removed, the heads 16 are raised above the corresponding seats formed by the openings in the cover 17 under the action of the spring on the corresponding head 18 whereby the disc 14 is also raised.

The maximum stroke allowed for said spring gives the rods a freedom of movement towards the lower surface of the cover 17 to an extent such that the contents of the container may readily drop out when the latter is shaken in its upside down position, while the sweeping of the periphery of the openings is ensured by the corresponding rods.

In contradistinction, when the container is in its inoperative condition, the cap 19 is fitted over said container, so as to compress the spring whereby the head 18 and the heads 16 are urged downwardly against the cover. The fluidtightness of the container is thus ensured twice, once through the closing of the openings in the cover by the heads 18 and 16 and furthermore by the cap 19 fitted over the upper edge of the container neck.

FIG. 5 illustrates a fourth embodiment wherein the rods 20 are rigidly secured to a grid 21 which is adapted to move with a slight lateral clearance between a bearing flange 22 on the inner wall of the container and the cover 23. Each rod 20 extends at least partly through one of the openings 24 provided in the cover. When the container is inverted and shaken, the grid and the rods may move in a manner such that the periphery of each opening is swept and kept clean.

FIG. 6 shows in plan view the symmetrical arrangement of the rods with reference to the openings in the cover of the container when inoperative.

According to a modification, which is not illustrated, the upper ends of the rods in the embodiment of FIG. 5 may be incurved so that the whole system including the grid and rods may be suspended from the cover in which case the bearing surface 22 formed on the container may be eliminated.

What I claim is:

1. In combination with a dispensing container, the provision of a cover in which a number of dispensing openings are formed, a rod adapted to slide in each of at least some of said openings, a head rigid with the outer end of each rod and the diameter of which is larger than that of the corresponding opening in the cover in order to close said opening when the container is standing upright, at least one spring fitted between the head of at least one rod and the outer surface of the cover to release the openings in the latter, a common grid to which the inner ends of the rods lying inside the container are secured and holding the rods against dropping out of the container when the latter is turned upside down for dispensing its contents, said rods being adapted to sweep the periphery of the openings upon shaking of the container, a fluidtight cap removably fitted over the cover and adapted to urge the heads of the rods into engagement with the peripheries of the openings against the action of said spring.

2. In combination with a dispensing container, the provision of a cover in which a number of dispensing openings are formed, a rod adapted to slide in each of at least some of said openings, a head integral with the outer end of each rod, the diameter of said head being greater than that of the corresponding opening in the cover so that the head closes said opening when the container is standing upright, and a counterhead integral with the inner end of each rod, the diameter of said counterhead being greater than that of the corresponding opening in the cover so that the rod is prevented from dropping out of the container when the latter is turned upside down for dispensing its contents, said rods being independent of each other and being adapted to sweep the periphery of the openings upon shaking of the container, and said cover and said rods including the heads and counterheads being made of a yieldable, deformable material and at least one of said heads of each of said rods being only slightly larger than said openings in the cover, whereby said rods may be readily inserted into or extracted from the corresponding openings in said cover.

3. The combination according to claim 2, in which the cover and the rods including the heads and counterheads are made of a yieldable, deformable plastic material.

References Cited by the Examiner

UNITED STATES PATENTS

| | | | |
|---|---|---|---|
| 355,255 | 12/1886 | Cram | 222—196.3 |
| 836,748 | 11/1906 | Gallisath | 222—196.3 |
| 900,583 | 10/1908 | Phenice | 222—196.3 |
| 1,592,035 | 7/1926 | Massuere | 222—196.3 |
| 2,185,896 | 1/1940 | Jones | 222—196.3 |
| 2,409,118 | 10/1946 | Fleak | 222—196.3 |
| 2,479,811 | 8/1949 | Calise | 222—196.3 |
| 2,558,442 | 6/1951 | Kasin | 222—196.2 |

LOUIS J. DEMBO, *Primary Examiner.*